(12) United States Patent
Bose et al.

(10) Patent No.: US 10,970,094 B2
(45) Date of Patent: Apr. 6, 2021

(54) SYSTEM AND METHOD FOR FACILITATING AVOIDING HUMAN ERRORS

(71) Applicant: HCL Technologies Limited, Noida (IN)

(72) Inventors: Deepak Bose, Noida (IN); Vidya Padmanabh Hirlekar, Hyderabad (IN); Gopinath Venkataswamy, Chennai (IN); Mukesh Verma, Noida (IN)

(73) Assignee: HCL TECHNOLOGIES LIMITED, Noida (IN)

( * ) Notice: Subject to any disclaimer, the term of this patent is extended or adjusted under 35 U.S.C. 154(b) by 379 days.

(21) Appl. No.: 15/091,718

(22) Filed: Apr. 6, 2016

(65) Prior Publication Data

US 2017/0090954 A1 Mar. 30, 2017

(30) Foreign Application Priority Data

Sep. 24, 2015 (IN) .......................... 3041/DEL/2015

(51) Int. Cl.
  *G06F 3/048* (2013.01)
  *G06F 9/451* (2018.01)
(52) U.S. Cl.
  CPC .................................. *G06F 9/453* (2018.02)
(58) Field of Classification Search
  CPC ........ G06F 9/453; G06F 11/07; G06F 3/0481; G06F 9/444; H04L 67/303
  USPC ................................. 715/705, 708, 709, 710
  See application file for complete search history.

(56) References Cited

U.S. PATENT DOCUMENTS

| | | | | |
|---|---|---|---|---|
| 2004/0036718 | A1* | 2/2004 | Warren | G06F 17/30994 715/744 |
| 2005/0262476 | A1* | 11/2005 | Felts | G06F 9/445 717/115 |
| 2007/0214427 | A1* | 9/2007 | Peck | G06F 9/453 715/771 |
| 2011/0106876 | A1* | 5/2011 | Delaney | H04L 63/102 709/203 |
| 2012/0143616 | A1 | 6/2012 | Pulak et al. | |
| 2016/0110054 | A1* | 4/2016 | Kondik | G06F 17/248 715/765 |

FOREIGN PATENT DOCUMENTS

JP 4454358 B2 4/2010

* cited by examiner

*Primary Examiner* — Alex Olshannikov
(74) *Attorney, Agent, or Firm* — Shumaker, Loop & Kendrick, LLP

(57) ABSTRACT

The present disclosure discloses system and method for facilitating avoiding of human errors in human error detection environment. At first, a plurality of configurations corresponding to a plurality of machines may be received. Further, a plurality of scripts may be configured corresponding to the plurality of machines based on the plurality of configurations. Further, of the plurality of scripts, may be executed on a machine, of the plurality of machines. Based on the executing of the script, a message and a graphical user interface (GUI) may be displayed on the machines. Further, the message and the GUI may be customized based on the configuration of the machine. Further, the customized message and the GUI guide the user interacting with the machine to avoid the human errors.

11 Claims, 15 Drawing Sheets

SYSTEM AND METHOD FOR FACILITATING AVOIDING HUMAN ERRORS

CROSS-REFERENCE TO RELATED APPLICATIONS AND PRIORITY

The present application claims benefit from Indian Complete Patent Application No. 3041/DEL/2015, filed on Sep. 24, 2015, the entirety of which is hereby incorporated by reference.

TECHNICAL FIELD

The present subject matter described herein, in general, relates to a system and method for avoiding human errors in a human error detection environment.

BACKGROUND

In a service industry, human errors have become a common issue. Occurrence of the human errors is a natural thing. Human errors may occur because of inappropriate or undesirable human decision, action or behavior that reduces, or has the potential for reducing effectiveness, safety, or system performance. Examples of human errors include forgetting to do something assigned and allocated, being careless about one's actions; or performing an act beyond an approved change window, among others.

The occurrence of such human errors affects a client's trust and also impacts business as well. Further, cost involved in recovering from these human errors is very high. Lot of resources is required to be engaged during the recovery process. Different measures have been taken for handling these human errors, but most of them were implemented post occurrence of the human errors. Very few solutions are present which deals with pre-occurrence of the human errors. However, lots of loop holes exist with these solutions too. One of such loop holes is that, an error message displayed is generalized and provides no specific instructions to avoid the human errors.

SUMMARY

This summary is provided to introduce aspects related to a system and method for facilitating avoiding of human errors in a human error detection environment are further described below in the detailed description. This summary is not intended to limit the scope of the subject matter disclosed herein.

In one implementation, a system for facilitating avoiding of human errors in a human error detection environment is disclosed. The system may include a processor and a memory coupled to the processor. The processor may execute a set of instructions stored in the memory to receive a plurality of configurations corresponding to a plurality of machines such that each machine has a corresponding configuration. Further, the processor may execute a set of instructions to configure a plurality of scripts corresponding to the plurality of machines based on the plurality of configurations. The processor may further execute a set of instructions to execute a script, of the plurality of scripts, configured corresponding to a machine, of the plurality of machines. Further, the processor may further execute a set of instructions to display a message on a graphical user interface (GUI) of the machine to a user based upon the execution of the script. Further, the message and the GUI may be customized based on the configuration of the machine in a manner such that the user interacting with the machine is guided to avoid human errors.

In another implementation, a method for facilitating avoiding of human errors in a human error detection environment is disclosed. The method may include receiving, by a processor, a plurality of configurations corresponding to a plurality of machines such that each machine has a corresponding configuration. Further, the method may include a step of configuring, by the processor, a plurality of scripts corresponding to the plurality of machines based on the plurality of configurations. The method may further include a step of executing, by the processor, a script, of the plurality of scripts, configured corresponding to a machine, of the plurality of machines. Further, the method may include a step of displaying, by the processor, a message on a graphical user interface (GUI) of the machine to a user based upon the execution of the script. Further, the message and the GUI may be customized based on the configuration of the machine in a manner such that the user interacting with the machine is guided to avoid human errors.

In yet another implementation, a non-transitory computer readable medium embodying a program executable in a computing device for facilitating avoiding of human errors in a human error detection environment is disclosed. The program may include a program code for receiving a plurality of configurations corresponding to a plurality of machines such that each machine has a corresponding configuration. The program may further include a program code for configuring a plurality of scripts corresponding to the plurality of machines based on the plurality of configurations. Further, the program may include a program code for executing a script, of the plurality of scripts, configured corresponding to a machine, of the plurality of machines. The program may further include a program code for displaying a message on a graphical user interface (GUI) of the machine to a user based upon the execution of the script. Further, the message and the GUI may be customized based on the configuration of the machine in a manner such that the user interacting with the machine is guided to avoid human errors.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

FIGS. 3A-3F illustrates examples of customized command-line interface (CLI) and warning messages for human error protection in a production server environment, in accordance with an embodiment of the present subject matter.

DETAILED DESCRIPTION

Figure 1:
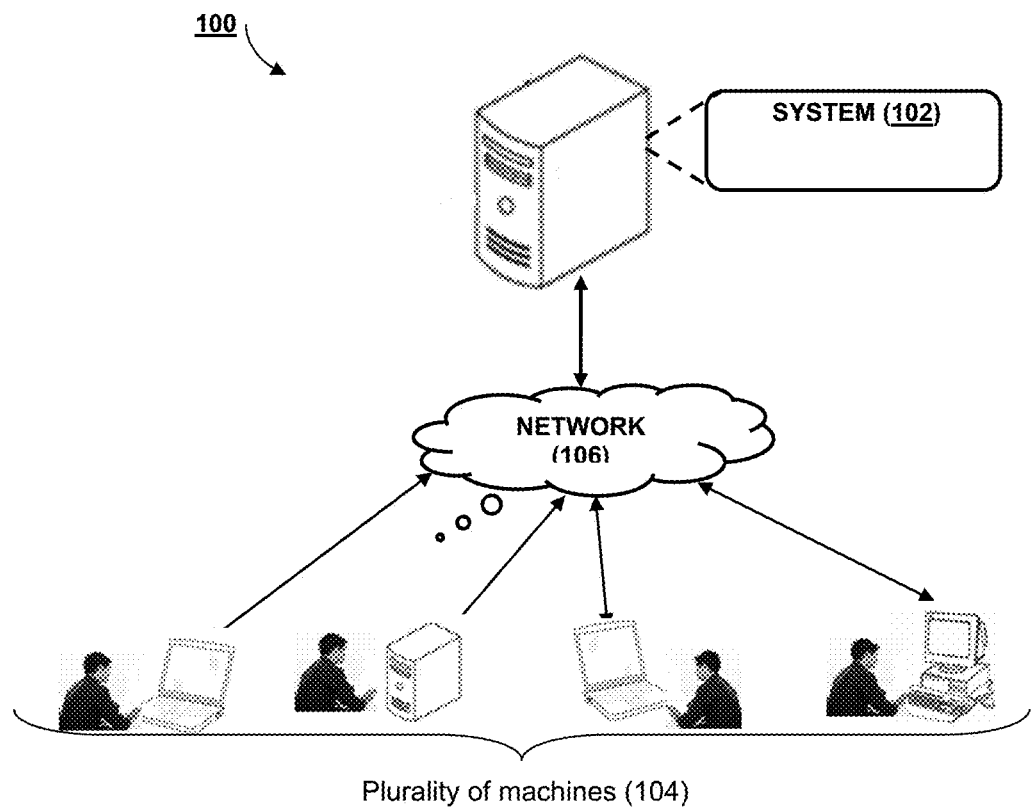
FIG. 1 illustrates a network implementation of a system for facilitating avoiding of human errors in a human error detection environment, in accordance with an embodiment of the present disclosure.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Referring to FIG. 1, a network implementation 100 of a system 102 for facilitating avoiding of human errors in a human error detection environment is illustrated, in accordance with an embodiment of the present subject matter. Although the present subject matter is explained considering that the system 102 is implemented as a software application on a server, it may be understood that the system 102 may also be implemented as a variety of computing systems, such as a laptop computer, a desktop computer, a notebook, a workstation, a mainframe computer, a server, a network server, a tablet, a mobile phone, a robot and the like. In one implementation, the system 102 may be implemented in a cloud-based environment. According to embodiments of present disclosure, plurality of machines 104 may be connected with the system 102 through a network 106. Examples of the plurality of machines may include, but are not limited to, a production server, an application server, a web server, a database server, a computer, a computing device, and a laptop, a portable computer, a personal digital assistant, a handheld device, and a workstation.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
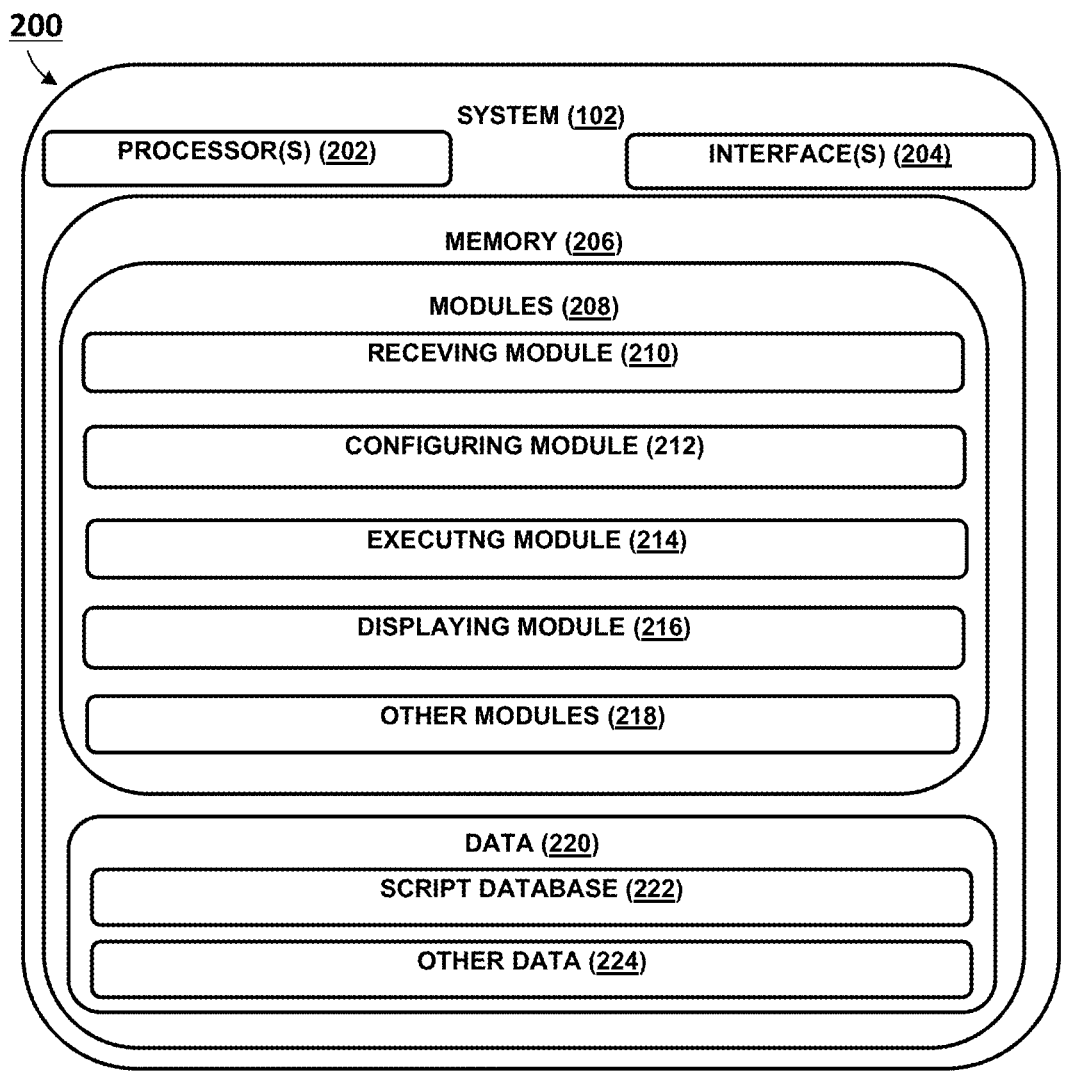
FIG. 2 illustrates the system, in accordance with an embodiment of the present subject matter.

Referring now to FIG. 2, the system 102 is illustrated in accordance with an embodiment of present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 which may perform particular tasks or implement particular abstract data types.

The modules 208 include routines, programs, objects, components, data structures, etc., which perform particular tasks or implement particular abstract data types. In one implementation, the modules 208 may include a receiving module 210, a configuring module 212, an executing module 214, a displaying module 216, and other modules 218. The other modules 218 may include programs or coded instructions that supplement applications and functions of the system 102.

The data 220, amongst other things, serves as a repository for storing data processed, received, and generated by one or more of the modules 208. The data 220 may also include a script database 222, and other data 224.

According to embodiments of present disclosure, the system 102 facilitates avoiding of human errors in a human error detection environment. In a service industry, the human errors are becoming a major problem. Occurring of the human errors not only involves cost and effort to recover them, but also impact trust and relationship with clients. Therefore, it is important to provide a solution for avoiding the human errors, instead of detecting the human errors post their occurrence. In the present disclosure, the system 102 facilitates this solution which alerts a user, working on his/her machine, about human errors before it actually occurs. This helps the user in taking appropriate decision for the preventing these human errors from getting occurred.

In a first step, the receiving module 210, of the system 102, may receive a plurality of configurations corresponding to a plurality of machines 104 in such a manner that each machine has a corresponding configuration. According to an embodiment of present disclosure, the plurality of machines 104 may belong to a particular organization where the system 102 may be implemented. Further, the plurality of machines 104 may comprise, but not limited to, a production server, an application server, a web server, a database server, a computer, a computing device, and a laptop, and the like. Further, the plurality of machines 104 has their specific functionalities and role which may be defined in the plurality of configurations received. For example, the production server may have some different functionality from the web server. Similarly, the application server may have different functionality than the database server. Thus, in order to differentiate amongst the plurality of machines 104, specific scripts may be required.

Therefore, in a next step, the configuring module 212, of the system 102, may configure plurality of scripts corresponding to the plurality of machines based on their plurality of configurations. Further, the plurality of scripts configured may be stored in a script database 222 of the system 102. The plurality of scripts may comprise specific instructions for each of the plurality of machines 104. As mentioned above, these scripts play important role for differentiating the plurality of machines amongst them. Thus, in the next step, the executing module 214, of the system 102, may execute the plurality of scripts of the plurality of machines 104.

When a script, of the plurality of scripts, is executed on a machine, the displaying module 216, of the system 102, may display a message on a graphical user interface (GUI) to a user on that machine. Further, the message and the GUI displayed may be customized based on the configuration of the machine. According to embodiments of present disclosure, the message displayed may be a kind of flyer for averting human errors. For example, a user working on the production server (a machine as shown in FIG. 1) may get a message specific to the functionality associated with the production server only. The message may contain some specific contents for guiding the user to avoid the human errors. According to an embodiment of present disclosure, Table 1 below is a list of message name with their purpose for avoiding the human errors.

TABLE 1

| Message Name | Purpose |
| --- | --- |
| Command Centre | Provides methods of averting human errors while working with Alerts |
| ITSM Platform | Provides methods of averting human errors while working on a ticketing tool |
| Backup | Provides methods of averting human errors while working on various backup platforms |
| Database | Provides methods of averting human errors while working on different database platforms |
| Storage | Provides methods of averting human errors while working on various storage products |
| Unix | Provides methods of averting human errors while working on different flavors of Unix |
| VMware | Provides methods of averting human errors while working on different versions of VMware |
| Windows | Provides methods of averting human errors while working on different windows version |
| Director Services | Provides methods of averting human errors while working on Microsoft supported directory services |
| MS Exchange | Provides methods of averting human errors while working on MS Exchange versions |
| Citirx | Provides methods of averting human errors while working on different versions of Citrix |
| AS400 & Main Frame | Provides methods of averting human errors while working on AS400 and Mainframe |
| Data Networks | Provides methods of averting human errors while working on different Data network products |
| Voice | Provides methods of averting human errors while working on different voice products |
| Security Operations | Provides methods of averting human errors while working on different Security based application or devices |

It may be observed from the above table/list, that these messages are provided to alert the user for avoiding the human errors. Further, the customized GUI also alerts and guides the user for avoiding the human errors. For example, the GUI of the machine may be customized in such a manner that wallpaper of the GUI may be displayed in different colors for alerting the user about the human errors. Also, the different fonts may be displayed for alerting the user. Thus, the system 102 provides improved interface to the user for avoiding the human errors. Few examples of the customized GUIs along with corresponding messages are explained in subsequent paragraphs of the specification.

Figures 3A, 3B:
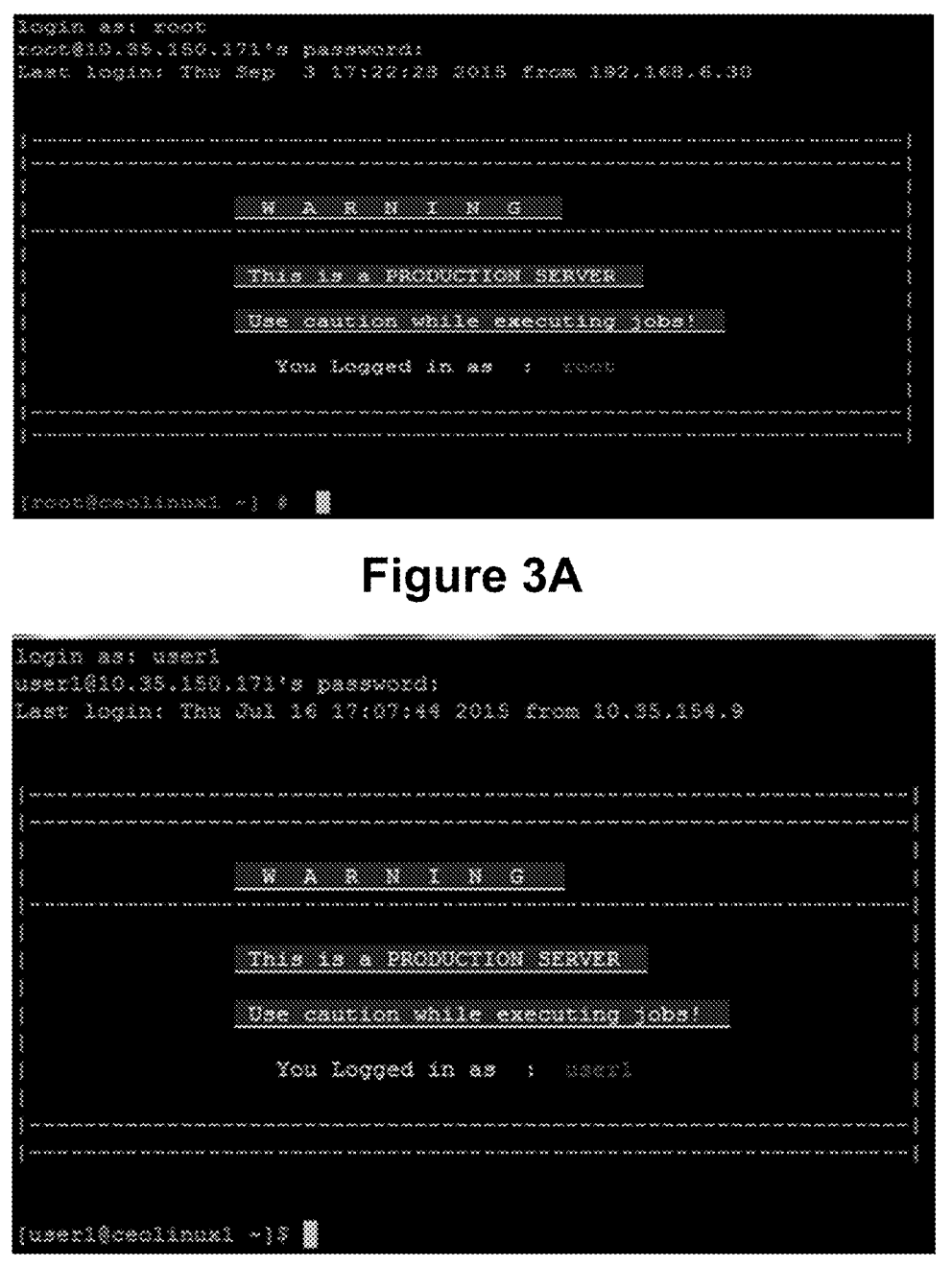
Figures 3C, 3D:
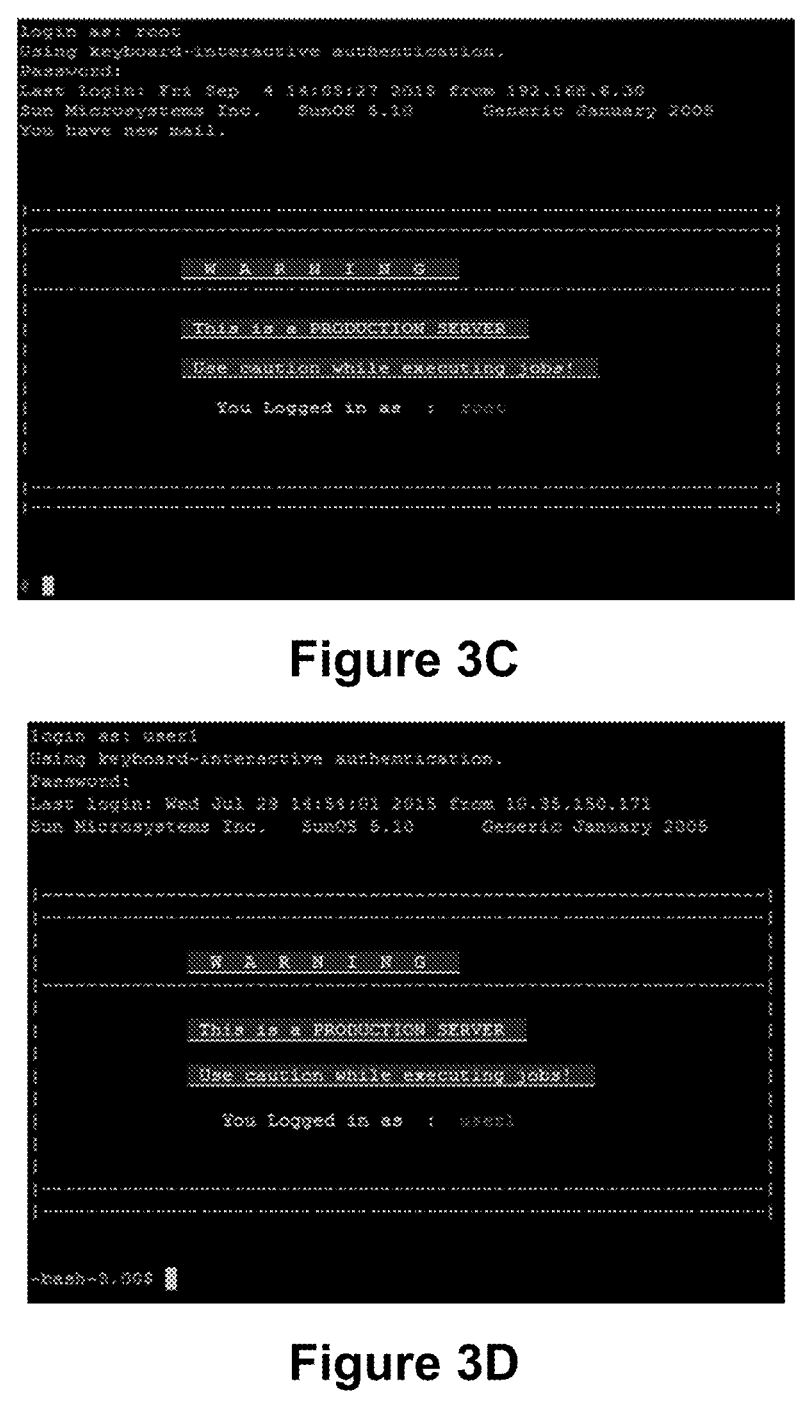
Figure 3E:
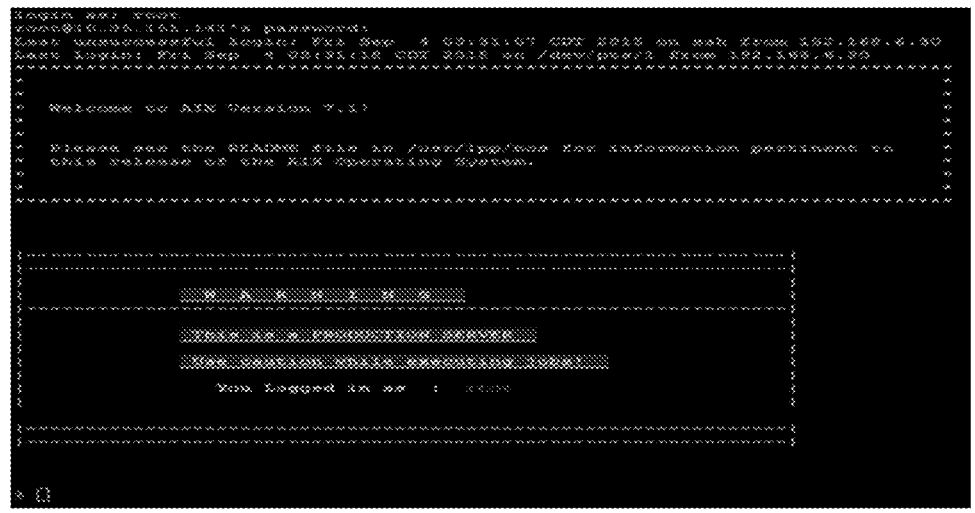

Referring now to FIGS. 3A-3F, examples of customized command-line interface (CLI) and warning messages for human error protection in a production server is shown, in accordance with an embodiment of present disclosure. In this example, the system 102 generates shell script (i.e., a script), which is exclusively generated for Linux, Solaris and AIX machines. The shell script when executed may change one or more configurations on the production servers. For example, upon execution of the shell scripts, a warning message for every login session may be displayed or a CLI may be customized by setting a red login prompt on the CLI when the user is a root user (i.e., a super user). Thus, the customization of the CLI and displaying of the warning message helps in getting user's attention and providing an alert for the user running any command accidently which may impact customer's production environment. As an example, a snapshot of the customized CLI along with the warning message corresponding to Linux server is shown in FIGS. 3A and 3B for root user (i.e., super user) and normal/simple user (user1) respectively. The system may execute bash shell script for displaying such warning messages and customizing the CLI. The two warning messages displayed on the CLI are "This is a PRODUCTION SERVER" and "Use caution while executing jobs". Along with the warnings messages, the system may also display logged-in user details. Further, the aforementioned shell script i.e., the bash shell script may be executed on different flavors of the Linux, for example, Red Hat Linux, Suse Linux and Centos Linux.

Figure 3F:

Similarly, the system 102 may generate a customized CLI along with a warning message corresponding to Solaris Server. This can be seen in FIGS. 3C and 3D for a super user (root user) and a simple user (user1) respectively. Further, similar to above two examples, a snapshot of a customized CLI along with a warning message corresponding to AIX server is shown in FIGS. 3E and 3F for root user (i.e., super user) and simple user (user1) respectively. In this case, the system 102 may execute a Korn shell script for displaying the warning messages and customizing the CLI.

Referring now to FIGS. 4A-4F and 4X-4Z, examples of customized GUIs and messages for human error protection in a production network environment is shown, in accordance with an embodiment of present disclosure. In this environment, a CMD script or a .BAT file script (i.e., network configuration scripts) may be executed for customizing GUIs and displaying messages to the user working in such production network environment. Two use cases may be considered for explaining this further. A first use case may be applying login banner to all network device through the CMD script or the .BAT file script. Whereas, the second use case may be applying login banner through configuration tool to all network devices.

Figures 4A, 4B:
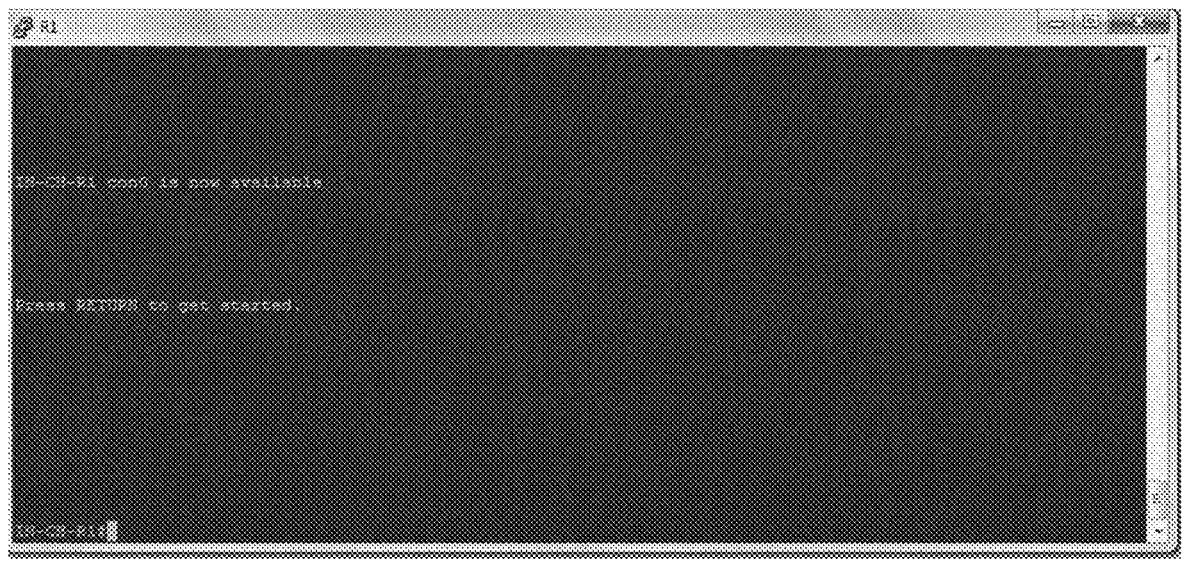
FIGS. 4A-4F and 4X-4Z illustrates examples of customized GUIs and messages for human error protection in a production network environment is shown, in accordance with an embodiment of present disclosure.
Figure 4C:
Figure 4D:
Figure 4E:
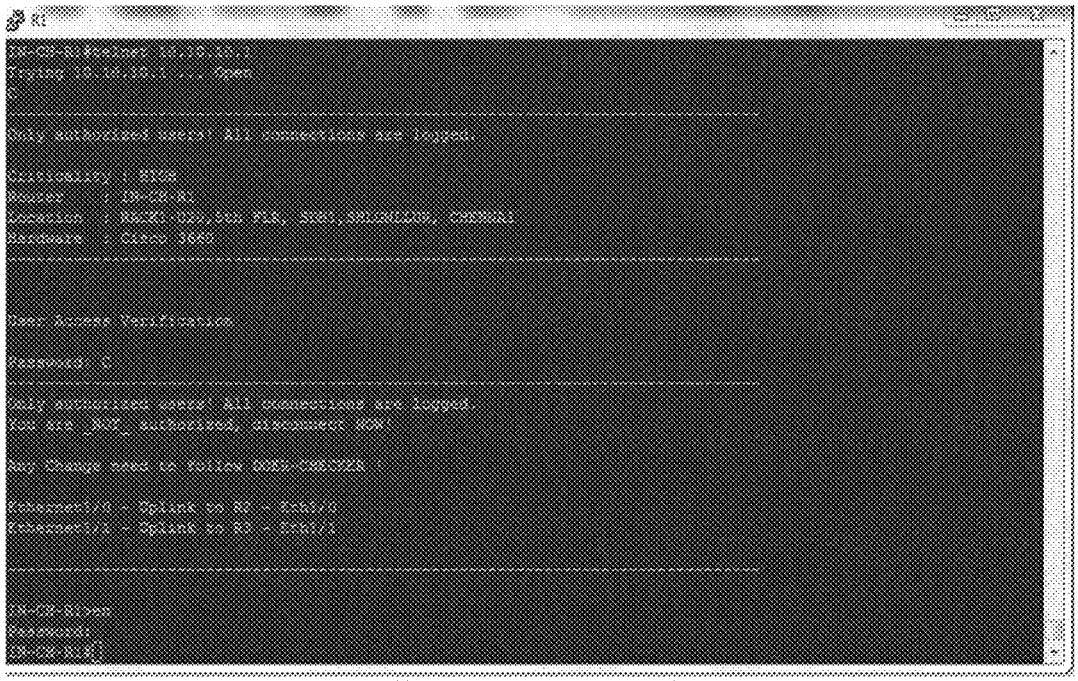
Figure 4F:
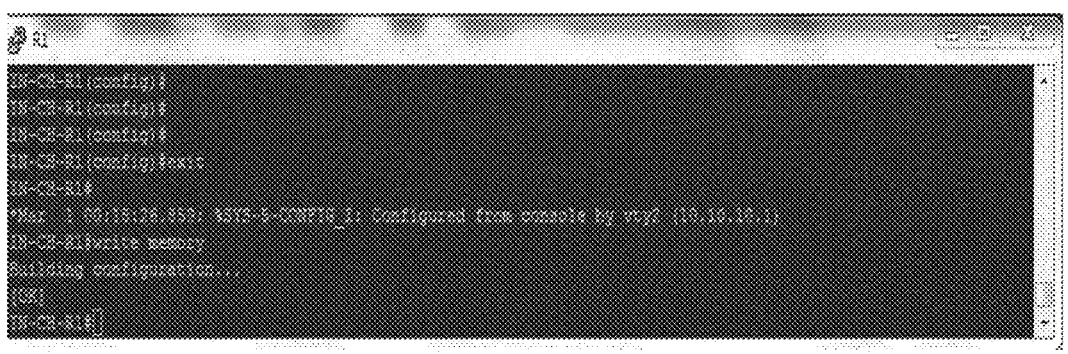

In the first use case, the login prompt banner which shows case device criticality and to follow a Doer-Checker policy is applied through the CMD script or the .BAT file is shown in FIG. 4A. Further, FIGS. 4B to 4F shows different GUIs and messages displayed in the production network environment. For example, the FIG. 4B shows that there is no login alerts highlighting nature of a device and to follow Doer-Checker policy. Further, the FIG. 4C displays different configurations which must be saved before applying any change in a network device. Further, the FIG. 4D is a snapshot of a GUI after running .txt files on a telnet device or running of .BAT file from windows machine. In the next step, the device login may be tested after the banner configuration as shown in FIG. 4E. In first stage of testing, the login banner is shown along with device nature in order to avoid unauthorized access. In second stage, after successful device authentication, exec banner shows the Doer-checker alert on the GUI. Further, after the successful testing, device configurations may be saved as shown in the FIG. 4F.

Figure 4X:
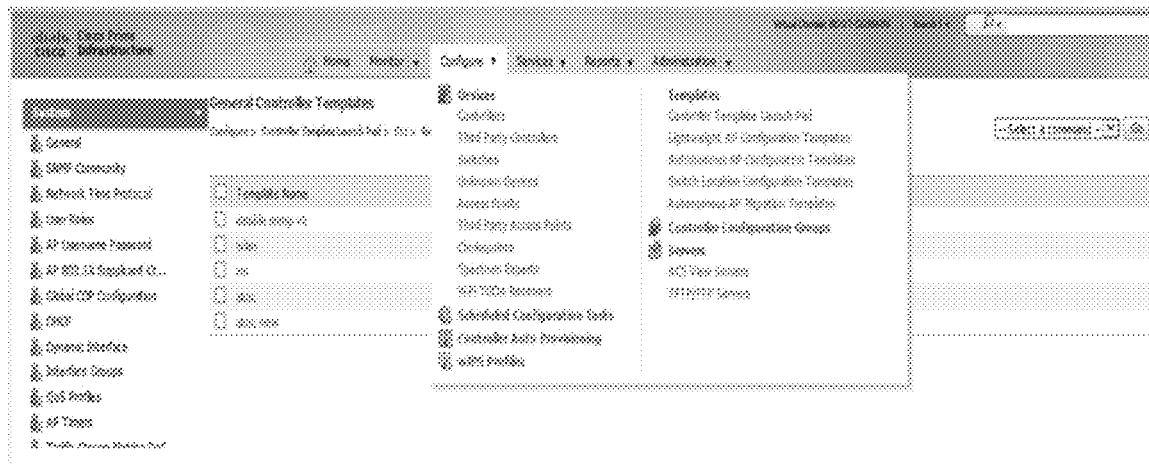
Figure 4Y:
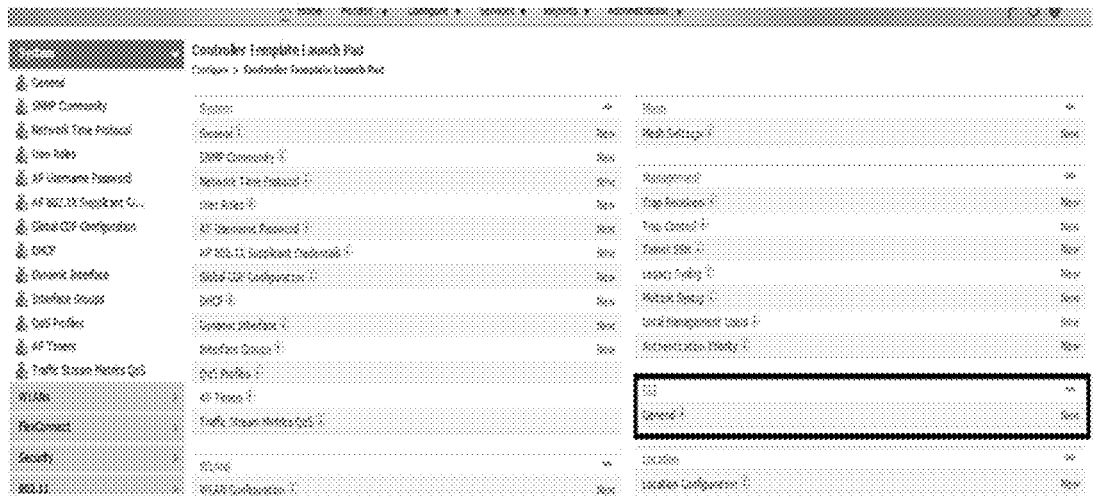
Figure 4Z:
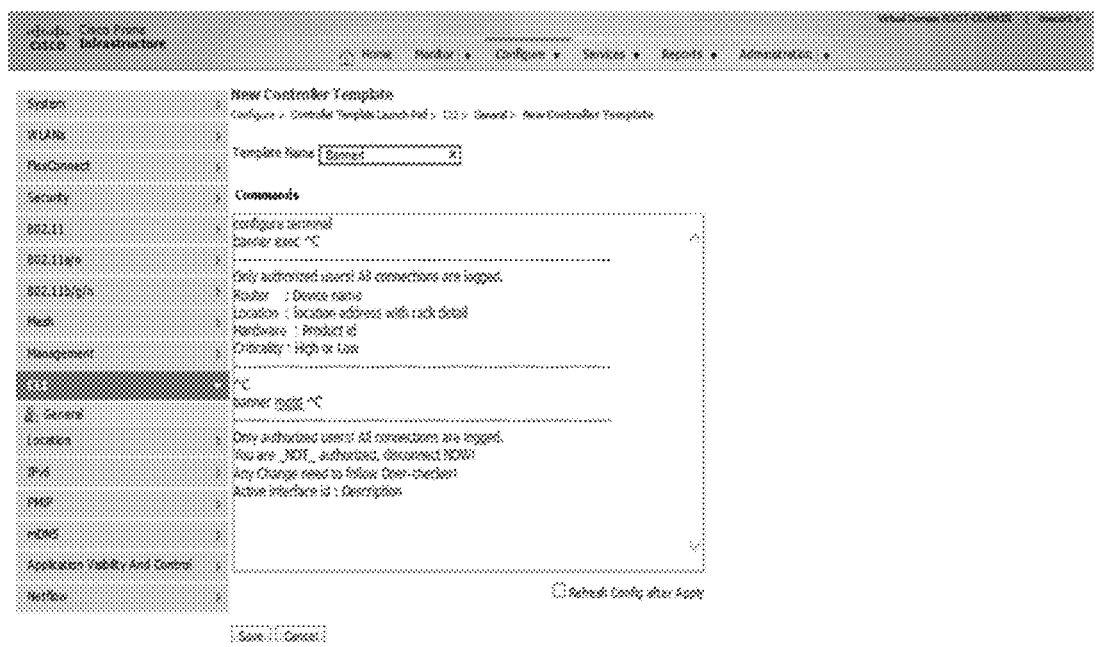

In the second use case, the login prompt banner is achieved through configuration tool, for example, Cisco prime tool is considered in this case. This is shown in FIGS. 4X-4Z. The FIG. 4X shows template section, in the Cisco prime tool, from where the user can select a template. Further, FIG. 4Y shows new template creation tab. Further, the FIG. 4Z shows creation of new script under the template name "banner". Thus, based on the environment, a network configuration script is prepared and saved.

Referring now to FIGS. 5A-5F, examples of customized GUIs and messages for human error protection in a server console is shown, in accordance with an embodiment of present disclosure. In this example, the system generates a HTA script which is exclusively generated for Windows server 2008 and Windows Server 2012 machines. The HTA script when executed may change one or more configurations on the server console. For example, upon execution of the HTA scripts, server console's background color may get changes in order to appeal the user attention and caution to the user running any commands accidently which will impact the customer production environment. This is explained using two cases. In a first use case, desktop and CMD prompt background color may be changed for specific Windows server 2008/2012 by using the HTA script. Whereas in second use case, desktop and CMD prompt background color may be changed for group of Windows server 2008/2012 by using the HTA script.

Figure 5A:
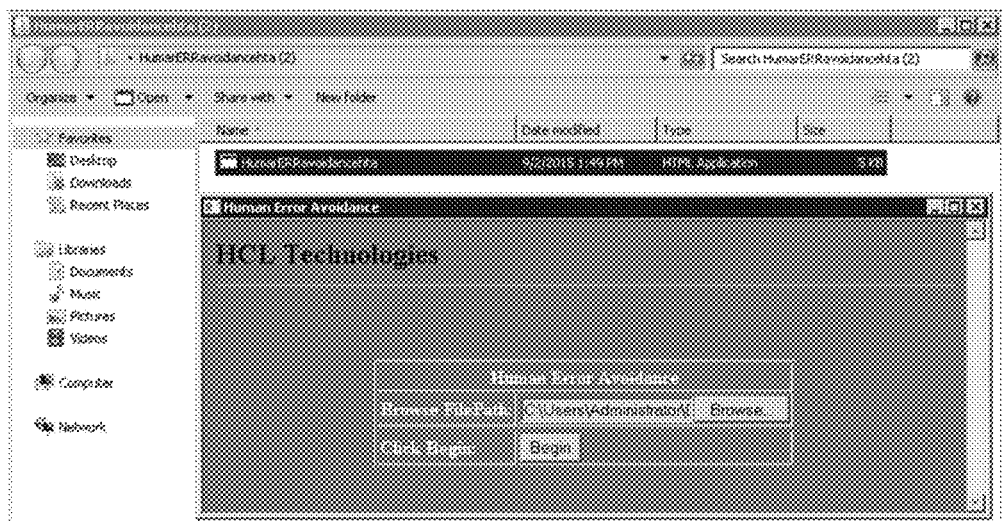
FIGS. 5A-5F illustrates examples of customized GUIs and messages for human error protection in a server console, in accordance with an embodiment of present disclosure.
Figure 5B:
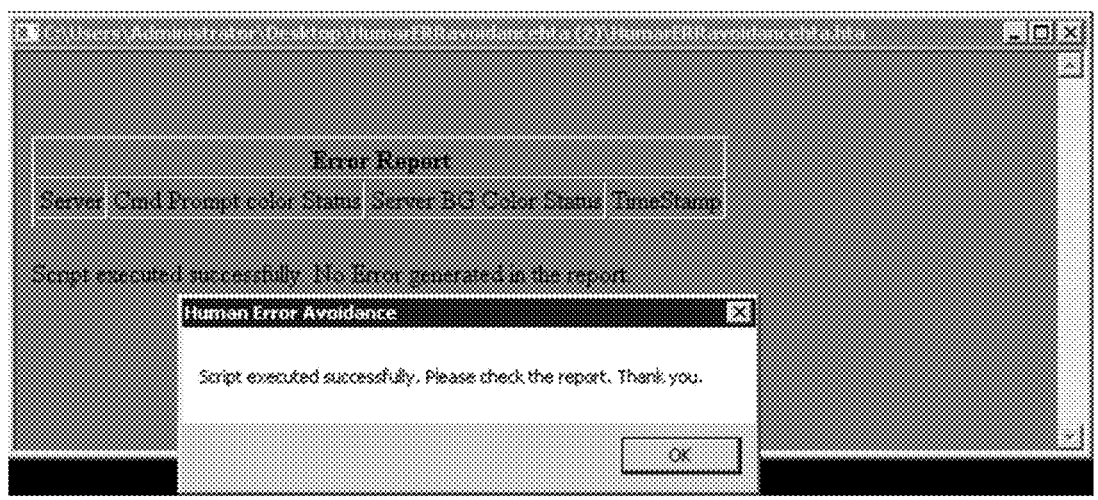
Figure 5C:
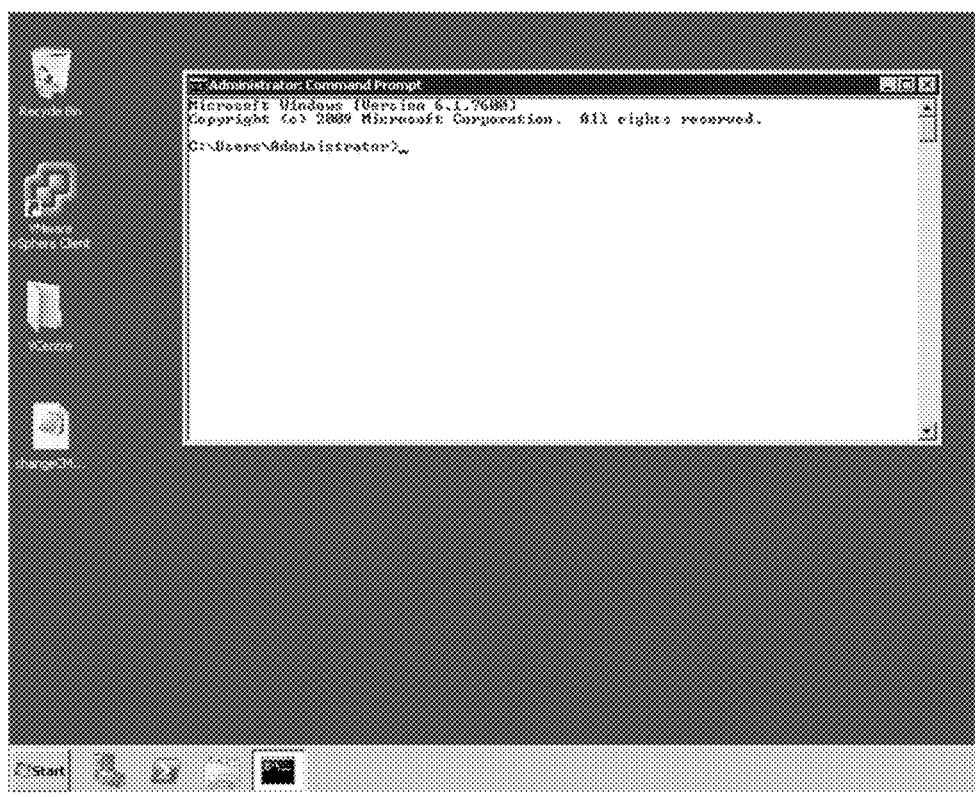

In the first use case, Internet Protocol (IP) address or fully qualified domain name (FQDN) of the server console is saved in a text file, and then script file is clicked. In the next step, a path of the text file may be provided and a "Begin" button is clicked, as shown in FIG. 5A. This enables the execution of the script. After the execution, the system may prompt the user to click "Ok" button, as shown in FIG. 5B. Thereafter, when the user logoff and again logon to the Windows Server, the script may change the background color of the desktop and color of the CMD prompt, as shown in FIG. 5C. Thus, the change in the background color alerts the user running any commands accidently which will impact the customer production environment.

Figure 5D:
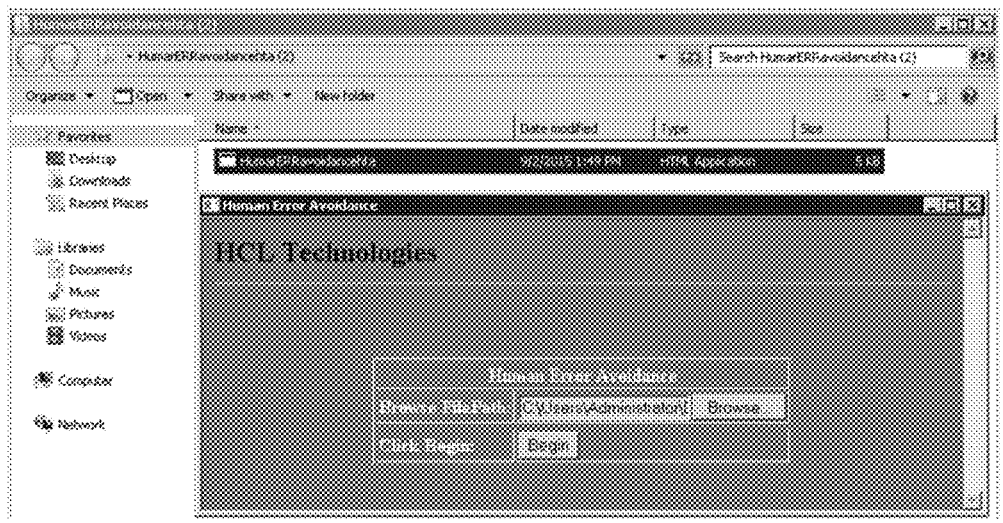
Figure 5E:
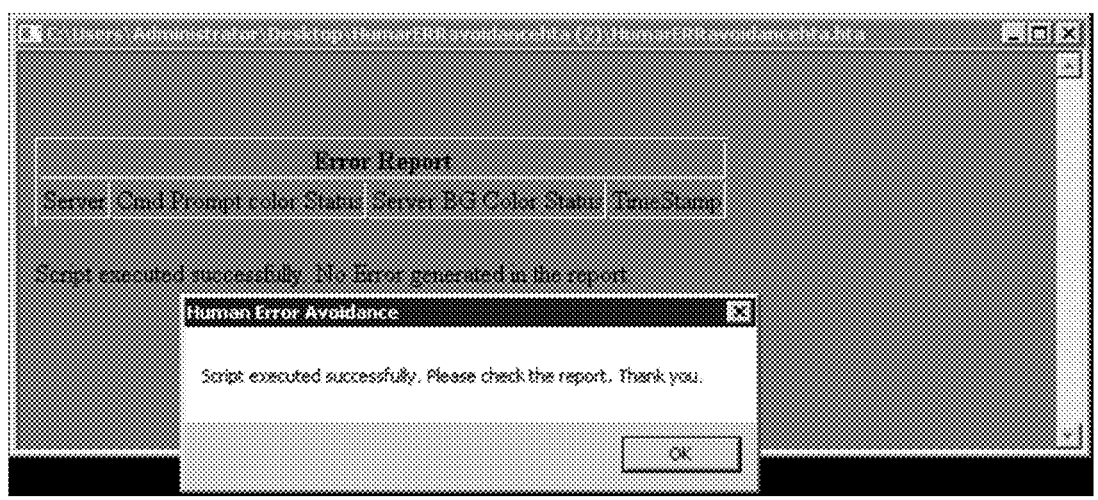
Figure 5F:
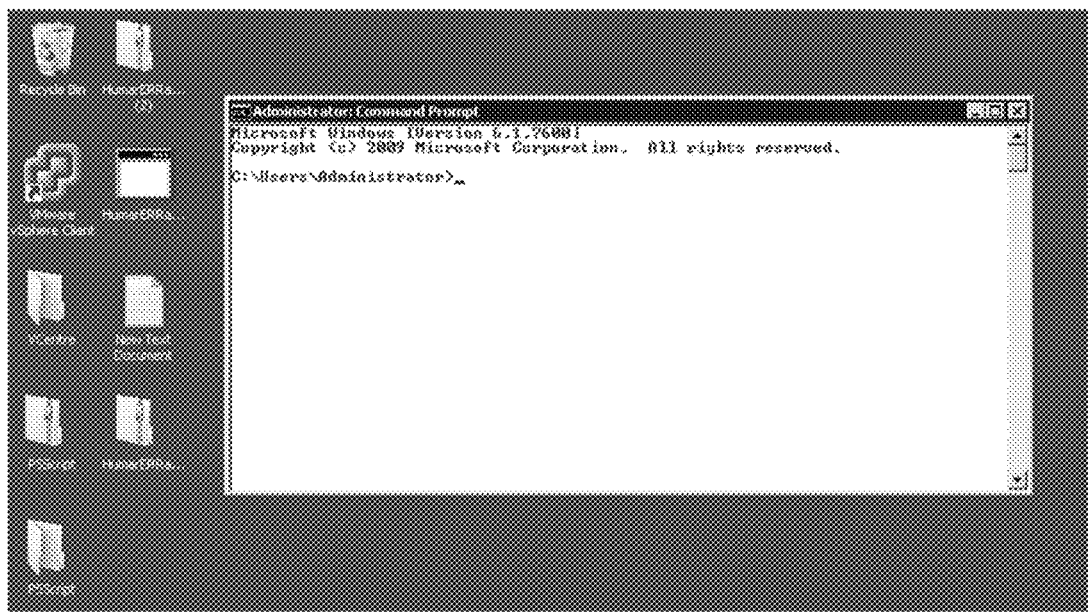

In the second use case, the Internet Protocol (IP) address or fully qualified domain name (FQDN) of the server console is saved in a text file, and then script file is clicked. Further, in next step, a path of the text file may be provided and a "Begin" button is clicked, as shown in FIG. 5D, which enables the execution of the script. After executing the script, the user may be click to "Ok" button, as shown in FIG. 5E. Further, when the user logoff and again logon to each of the Windows Servers, the script may change the background color of the desktop and color of the CMD prompt, as shown in FIG. 5F. Thus, the change in the background color alerts the user running any commands accidently which will impact the customer production environment.

Figure 6:
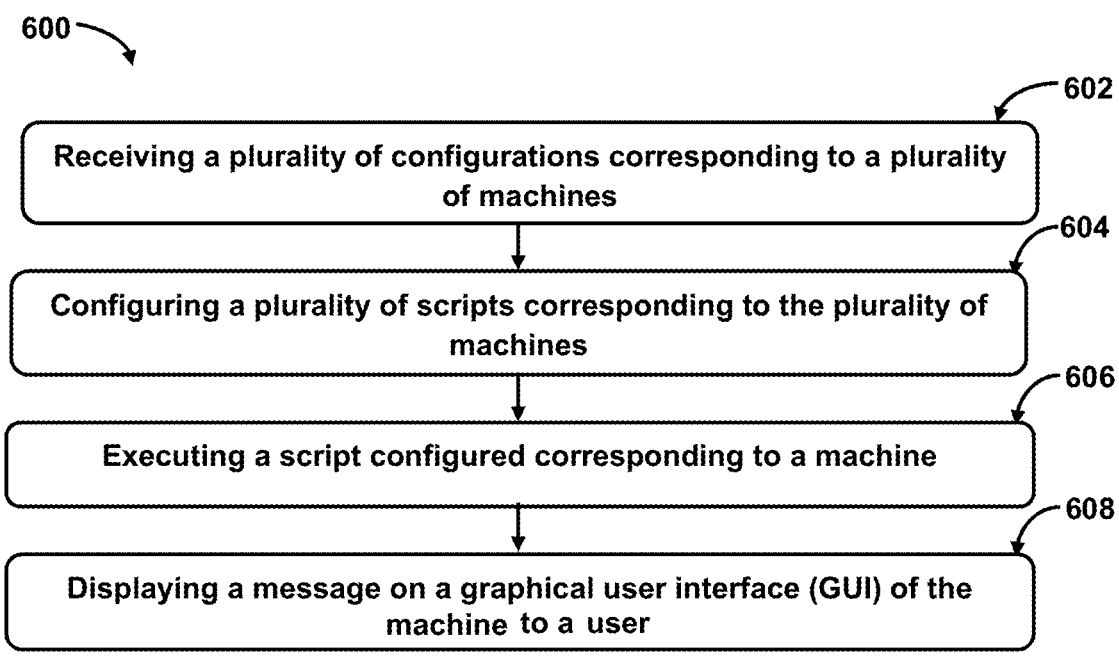
FIG. 6 illustrates a method for facilitating avoiding of human errors in a human error detection environment, in accordance with an embodiment of the present disclosure.

Referring now to FIG. 6, the method of facilitating avoiding of human errors in a human error detection environment is shown, in accordance with an embodiment of the present subject matter. The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented in the above described system 102.

At block 602, a plurality of configurations corresponding to a plurality of machines may be received. Further, each machine has a corresponding configuration.

At block 604, a plurality of scripts may be configured corresponding to the plurality of machines based on the plurality of configurations.

At block 606, a script, of the plurality of scripts, configured corresponding to a machine, of the plurality of machines may be executed.

At block 608, a message on a graphical user interface (GUI) of the machine may be displayed to a user based upon the execution of the script. Further, the message and the GUI may be customized based on the configuration of the machine in a manner such that the user interacting with the machine is guided to avoid human errors.

Although implementations for system and method for facilitating avoiding human errors have been described in language specific to structural features and/or methods, it is to be understood that the appended claims are not necessarily limited to the specific features or methods described. Rather, the specific features and methods are disclosed as examples of implementations for facilitating the avoidance of the human errors in the human error detection environment.

We claim:

1. A method for facilitating avoiding human errors in a human error detection environment, the method comprising:
receiving, by a processor, specific user privilege associated to a specific user and a plurality of configuration files corresponding to a plurality of machines such that each machine has a corresponding configuration file, wherein the plurality of configuration files define functionalities and roles associated to the plurality of machines;
configuring, by the processor, a plurality of scripts corresponding to the plurality of machines based on the plurality of configuration files, wherein the plurality of scripts comprises specific instructions for each of the plurality of machines, wherein each script is different for each machine amount the plurality of machines, and wherein the plurality of scripts change configurations of the plurality of machines;
executing, by the processor, a script, of the plurality of scripts, configured corresponding to a machine, of the plurality of machines, wherein the script comprises at least one of a .BAT file script, a CMD script, a .txt script, a shell script, a korn shell script, a bash shell script, and a HTA script, wherein the script executes independently of a version of operating system running on the machine; and
displaying, by the processor, a message on a customized graphical user interface (GUI) of the machine to the specific user based upon the execution of the script and the specific user privilege, wherein the GUI is customized according to configuration and execution of the script, wherein the message indicates a warning message, for the machine, used to get user's attention in order to avoid the human errors, wherein the message comprises a message name corresponding to at least one of a Command Centre, an ITSM platform, a Backup, a Database, a Storage, an Unix, a VMware, Windows, Direct services, an MS exchange, a Citrix, AS400 & Main frame, Data networks, Voice and Security operations, wherein the message is associated with a purpose guiding the user to avoid human error, wherein the message is customized based on the configuration of the machine upon execution of the script and wherein a wallpaper of the customized GUI is changed to a different color to display the message in a different font based on the configuration file of the machine and the specific user privilege in a manner such that the specific user interacting with the machine under the specific user privilege is guided to avoid human errors.

2. The method of claim 1, wherein the plurality of machines comprises at least one of a production server, application server, web server, database server, a computer, and a computing device.

3. The method of claim 1, wherein the configuration file comprises fonts, colors, and displays associated with the machine.

4. The method of claim 1, wherein the customization of the customized GUI comprises customizing font, images, and overall appearance of the GUI.

5. The method of claim 1, wherein execution of the script changes one or more configuration of the machine.

6. A system for facilitating avoiding human errors in a human error detection environment, the system comprises:
a processor;
a memory coupled to the processor, wherein the processor executes a set of instructions stored in the memory to:
receive specific user privilege associated to a specific user and a plurality of configuration files corresponding to a plurality of machines such that each machine has a corresponding configuration file, wherein the plurality of configuration files define functionalities and roles associated to the plurality of machines, wherein each script is different for each machine amongst the plurality of machines, and wherein the plurality of scripts change configurations of the plurality of machines;
configure a plurality of scripts corresponding to the plurality of machines based on the plurality of configuration files, wherein the plurality of scripts comprises specific instructions for each of the plurality of machines;
execute a script, of the plurality of scripts, configured corresponding to a machine, of the plurality of machines, wherein the script comprises at least one of a .BAT file script, a CMD script, a .txt script, a shell script, a korn shell script, a bash shell script, and a HTA script, wherein the script executes independently of a version of operating system running on the machine; and
display a message on a customized graphical user interface (GUI) of the machine to the specific user based upon the execution of the script and the specific user privilege, wherein the GUI is customized according to configuration and execution of the script, wherein the message indicates a warning message, for the machine, used to get user's attention in order to avoid the human errors, wherein the message comprises a message name corresponding to at least one of a Command Centre, an ITSM platform, a Backup, a Database, a Storage, an Unix, a VMware, Windows, Direct services, an MS exchange, a Citrix, AS400 & Main frame, Data networks, Voice and Security operations, wherein the message is associated with a purpose guiding the user to avoid human error, wherein the message is customized based on the configuration of the machine upon execution of the script, and wherein a wallpaper of the customized GUI is changed to a different color to display the message in a different font based on the configuration file of the machine and the specific user privilege in a manner such that the specific user interacting with the machine under the specific user privilege is guided to avoid human errors.

7. The system of claim 6, wherein the plurality of machines comprises at least one of a production server, application server, web server, database server, a computer, and a computing device.

8. The system of claim 6, wherein the configuration file comprises fonts, colors, and displays associated with the machine.

9. The system of claim 6, wherein the customization of the customized GUI comprises customizing font, images, and overall appearance of the GUI.

10. The system of claim 6, wherein execution of the script changes one or more configuration of the machine.

11. A non-transitory computer readable medium embodying a program executable in a computing device for facilitating avoiding human errors in a human error detection environment, the program comprising:
a program code for receiving user privilege associated to a specific user and a plurality of configuration files corresponding to a plurality of machines such that each machine has a corresponding configuration file, wherein the plurality of configuration files define functionalities and roles associated to the plurality of machines;
a program code for configuring a plurality of scripts corresponding to the plurality of machines based on the plurality of configuration files, wherein the plurality of scripts comprises specific instructions for each of the plurality of machines, wherein each script is different for each machine amongst the plurality of machines, and wherein the plurality of script change configurations of the plurality of machines;
a program code for executing a script, of the plurality of scripts, configured corresponding to a machine, of the plurality of machines, wherein the message indicates a warning message for the machine that is used to get user's attention in order to avoid the human errors, wherein the script executes independently of a version of operating system running on the machine; and
a program code for displaying a message on a customized graphical user interface (GUI) of the machine to the specific user based upon the execution of the script and the specific user privilege, wherein the GU is customized according to configuration and execution of the script, wherein the message indicates a warning message, for the machine, used to get user's attention in order to avoid the human errors, wherein the message comprises a message name corresponding to at least one of a Command Centre, an ITSM platform, a Backup, a Database, a Storage, an Unix, a VMware, Windows, Direct services, an MS exchange, a Citrix, AS400 & Main frame, Data networks, Voice and Security operations, wherein the message is associated with a purpose guiding the user to avoid human error, wherein the message is customized based on the configuration of the machine upon execution of the script, and wherein a wallpaper of the customized GUI is changed to a different color to display the message in a different font based on the configuration file of the machine and the specific user privilege in a manner such that the specific user interacting with the machine under the specific user privilege is guided to avoid human errors.

* * * * *